United States Patent [19]

Kanada et al.

[11] Patent Number: 4,529,143
[45] Date of Patent: Jul. 16, 1985

[54] WEBBING RETRACTOR

[75] Inventors: Shigeyasu Kanada; Shigeo Mizuno; Yoshio Nakano, all of Aichi, Japan

[73] Assignee: Kabushhiki Kaisha Tokai-Rika-Denki-Seisakusho, Aichi, Japan

[21] Appl. No.: 611,417

[22] Filed: May 17, 1984

[30] Foreign Application Priority Data

May 19, 1983 [JP] Japan .......................... 58-075129[U]

[51] Int. Cl.³ .................... A62B 35/00; B65H 75/48
[52] U.S. Cl. ........................... 242/107; 242/107.4 R; 280/807
[58] Field of Search ......... 242/107, 107.4 R, 107.4 E; 280/801–803, 806–808; 297/475–478

[56] References Cited

U.S. PATENT DOCUMENTS 4,002,219  1/1977  Steinmann .................. 242/107 X
4,487,381  12/1984  Kubota ........................ 242/107

FOREIGN PATENT DOCUMENTS

2742676  4/1979  Fed. Rep. of Germany ... 242/107.4 R

Primary Examiner—John M. Jillions
Attorney, Agent, or Firm—George J. Brandt, Jr.

[57] ABSTRACT

In a webbing retractor, a webbing takeup shaft is coupled on to a worm wheel through resilient means and a worm engaged with the worm wheel is connected to a drive means, whereby a biasing force of the resilient means is adjusted to decrease a webbing tension acting upon an occupant by a rotation of the drive means.

20 Claims, 12 Drawing Figures

WEBBING RETRACTOR

BACKGROUND OF THE INVENTION

1. Field of the Invention

The present invention relates to a webbing retractor adapted for use in a seatbelt system for protecting an occupant in an emergency situation of a vehicle to retract an occupant restraining webbing therein, and more particularly to a webbing retractor in which a webbing tension due to a retracting force of a webbing takeup shaft is decreased.

2. Description of the Prior Art

In the webbing retractor adapted for use in the seatbelt system, the webbing is secured at its one end to the takeup shaft which is rotated by a biasing force of a spiral spring to retract the webbing in layers thereon.

The biasing force of the spiral spring is set at a predetermined value or more so as to retract the webbing reliably on the takeup shaft after the occupant releases the webbing from its restraining situation on the occupant. Accordingly, the webbing must be unwound with a relatively large power when it is fastened on the occupant, and the webbing gives a relatively large pressure to the occupant when the occupant is restrained by the webbing.

In a conventional art such a webbing retractor has been proposed that a motor is used instead of the spiral spring and a driving force thereof is transmitted to the takeup shaft so that the takeup shaft is rotated to retract the webbing thereon.

In the webbing retractor, however, there is such a problem that a control of the motor is complicated and in some cases when the webbing is retracted on to the takeup shaft by the motor in order to cancel a slack of the webbing restraining the occupant a small shock is given to the occupant, especially, his shoulder portion, which results in an unpleasant feeling to the occupant.

In the webbing retractor there is also, in some cases, such a problem that when a trouble occurs in a control system, an electric system or a motor body it is made possible to only unwind the webbing from the takeup shaft.

SUMMARY OF THE INVENTION

In view of the above facts, the present invention has as its object the provision of a webbing retractor having a simple construction in which a webbing tension is decreased to enhance a comfortability of an occupant restrained by a webbing and the occupant can be kept in his restrained situation even when a trouble occurs in an electric system or the like.

In the webbing retractor according to the present invention, a webbing takeup shaft is coupled on to a worm wheel through resilient means and a worm engaged with the worm wheel is connected to drive means, whereby a biasing force of the resilient means is adjusted to decrease a webbing tension acting upon an occupant by a rotation of the drive means. Thus, as the takeup shaft is coupled to the worm through the resilient means, a comfortability of an occupant fastened by the webbing is enhanced, and the occupant can be maintained in his restrained situation by a combination of the worm wheel and the worm, even when the trouble occurs in the motor or the like.

Description will hereinunder be given of embodiments of the present invention with reference to the drawings attached hereto.

DESCRIPTION OF THE PREFERRED EMBODIMENTS

Figure 1:
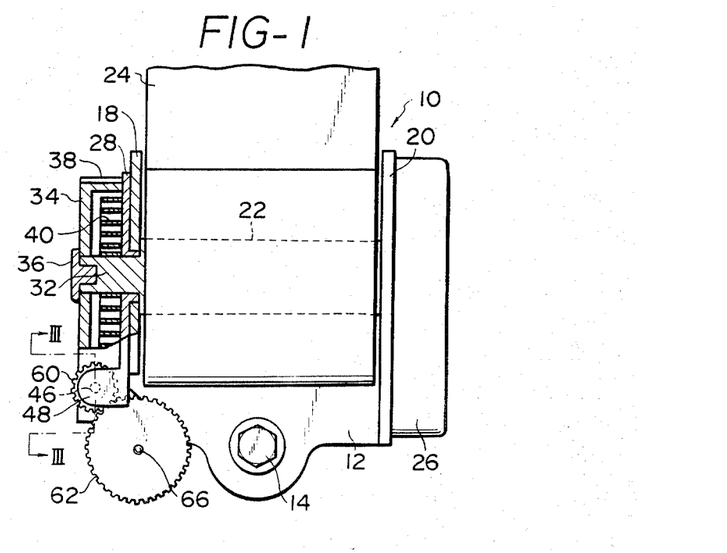
FIG. 1 is a partially sectional front view showing a first embodiment of a webbing retractor according to the present invention.
Figure 2:
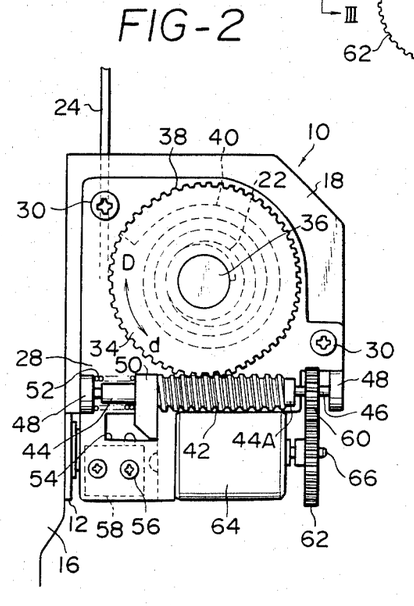
FIG. 2 is a left side view of FIG. 1.

In FIGS. 1 and 2 shown is a webbing retractor 10 according to the present invention.

In the webbing retractor 10 its frame 12 is fixed to a portion of a vehicle body 16 through a mounting bolt 14.

A pair of leg plates 18 and 20 extend from both side portions of the frame 12 in parallel with each other.

The leg plates 18 and 20 rotatably support both end portions of a webbing takeup shaft 22, and one end of an occupant restraining webbing 24 is secured to an intermediate portion of the takeup shaft 22 and is retracted in layers thereon. The other end (not shown) of the webbing 24 is secured to another portion of the vehicle body 16 through a tongue plate and a buckle device to which the tongue plate is latched, and an intermediate portion thereof can be applied to restrain an occupant.

Mounted on an outside of the leg plate 20 between the leg plate 20 and the takeup shaft 22 is an inertial locking mechanism 26. The inertial locking mechanism 26 has an ordinary construction, i.e., it is constructed so as to detect an acceleration of the vehicle or unwinding acceleration of the webbing 24 to stop an unwinding rotation of the takeup shaft 22 urgently in an emergency situation of the vehicle.

Fixed to an outside of the leg plate 18 is a plate holder 28 through screws 30. The takeup shaft 22 is formed with a small diameter portion 32 piercing the plate holder 28. A forward end portion of the small diameter portion 32 rotatably supports a cylindrical spring case 34 at its bottom plate. The spring case 34 is prevented from being pulled out of the small diameter portion 32 by a stopper 36 forced into the forward end portion of the small diameter portion 32.

Also, the spring case 34 is formed at outer periphery thereof with a worm wheel 38 and it is secured at its inner periphery with an outer end of a spiral spring 40. The spiral spring 40 is disposed coaxially with the samll diameter portion 32 and it is secured at its inner end to the small diameter portion 32. Accordingly, when the spring case 34 is rotated in a direction of arrow d shown in FIG. 2, a biasing force of the spiral spring 40 is increased, i.e., retracting force of the takeup shaft 22 is increased, but when the spring case 34 is rotated in a direction of arrow D shown in FIG. 2, the retracting force is decreased.

Figure 3:
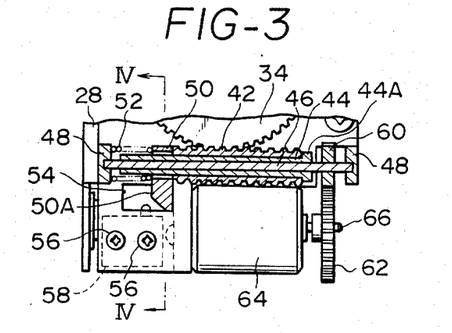
FIG. 3 is a sectional view taken along a line III—III of FIG. 1.
Figure 4:
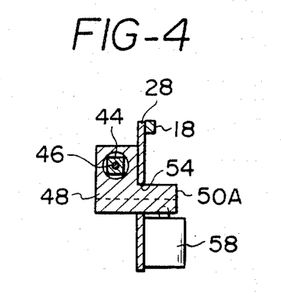
FIG. 4 is a sectional view taken along a line IV—IV of FIG. 3.

As shown in FIG. 3, a worm 42 engaged with the worm wheel 38 is rotatably supported by brackets 48 of the plate holder 28 through a guide member 44 and a shaft 46. That is to say, the shaft 46, both end portions thereof being rotatably supported by the brackets 48, is fixed at its intermediate portion with the guide member 44, and the guide member 44 is rotated together with the shaft 46. The guide member 44 is formed in a rectangular shape, as shown in FIG. 4. The worm 42 is formed at its axial center portion with a rectangular hole receiving the guide member 44 therein. Accordingly, the worm 42 rotates together with the guide member 44 and the shaft 46, but it is movable relative thereto in an axial direction of the shaft 46.

Figure 5:
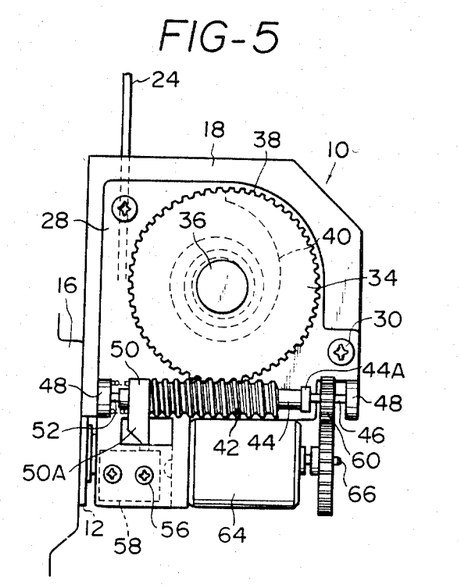
FIG. 5 is an operational view of FIG. 2.

The relative movement of the worm 42 is restricted in one direction by a large diameter portion 44A formed on one end portion of an axial direction of the guide member 44, i.e., the worm 42 is restricted from movement in such a direction that the worm 42 is subjected to a reaction force of the spiral spring 40 through the spring case 34. Also, the guide member 44 rotatably supports an actuator 50 close to opposite end portion of the guide member 44 to the large diameter portion 44A through the worm 42. The actuator 50 is formed with a circular hole through which the guide member 44 passes, whereby the actuator 50 is rotatable relative to the guide member 44. Confined between the actuator 50 and one of the brackets 48 of the plate holder 28 is a compression coil spring 52 which is compressed in a direction of the worm 42, so that the compression coil spring 52 together with the worm 42 is movable in the axial direction of the shaft 46. FIG. 3 shows such a situation that the worm 42 and the actuator 50 are moved until the worm 42 is caused to abut on the large diameter portion 44A. On the other hand, FIG. 5 shows such a situation that the worm 42 and the actuator 50 are moved against a biasing force of the compression coil spring 52 in a maximum amount in a reverse direction to the above direction.

In the actuator 50 its leg portion 50A penetrates an opening 54 of the plate holder 28, as shown in FIG. 4, and it is opposed to a limit switch 58 fixed to a reverse face of the plate holder 28 through screws 56. The limit switch 58 is switched off when it is put in a separated situation from the actuator 50, as shown in FIG. 3, and the limit switch 58 is switched on when it is caused to abut on the actuator 50, as shown in FIG. 5.

The shaft 46 is fixed close to the large diameter portion 44A with a pinion 60 which is engaged with a gear wheel 62. The gear wheel 62 is fixed to an output shaft 66 of a motor 64 fixed to the plate holder 28.

Figure 6:
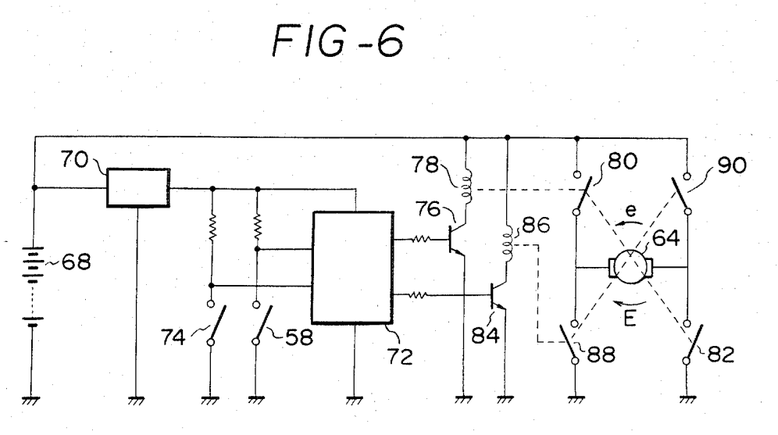
FIG. 6 is a control circuit diagram of the first embodiment.

FIG. 6 shows a circuit diagram of a control circuit for controlling the motor 64 as is drive means.

In the control circuit a vehicle power source 68 such as a car battery is connected to a microcomputer 72 through a constant-voltage circuit 70. Signals of the limit switch 58 and a buckle switch 74 are sent to the microcomputer 72. The buckle switch 74 has such an ordinarily closed contact that the buckle switch 74 is switched on when the tongue plate (not shown) secured to the forward end of the webbing 24 shown in FIG. 1 is latched to the buckle device so that the occupant is put in the restrained situation by the webbing 24 but the buckle switch 74 is switched off, when the tongue plate is separated from the buckle device so that the occupant is released from the restrained situation.

The microcomputer 72 is constructed so as to operate a switching element 76 to excite a solenoid of a relay 78 when the limit switch 58 is switched on. The relay 78 switches on switches 80 and 82 by the excitation of the solenoid of the relay 78 to connect the motor 64 electrically to the vehicle power source 68, thereby rotating the motor 64 in a direction of arrow E. When the motor 64 is rotated in the direction of arrow E, the spring case 34 shown in FIG. 2 is rotated in the direction of arrow D through the worm 42 and the worm wheel 38. Also, when the buckle switch 74 is switched on, a solenoid of a relay 86 is excited by a switching element 84, so that switches 88 and 90 are switched on by the excitation of the solenoid of the relay 86 and the motor 64 is rotated in a direction of arrow e. Accordingly, the spring case 34 is rotated in the direction of arrow d by the rotation of the motor 64 in the direction of arrow e.

Description will now be given of operation of the first embodiment thus constructed.

In case that the webbing 24 is not used, i.e., the webbing 24 is full retracted on to the takeup shaft 22, the worm 42 is put in a position shown in FIGS. 1 and 2 and the limit switch 58 is off.

When the webbing 24 is unwound from the takeup shaft 22 in order to restrain the occupant with the webbing 24, the takeup shaft 22 is rotated so as to rotate the inner end of the spiral spring 40 in a clockwise direction of FIG. 2 so that the biasing force of the spiral spring 40 is increased. As the spring case 34 is subjected to a rotation force in the clockwise direction by the increase of the biasing force of the spiral spring 40, the worm 42 is subjected to a force in a left direction in FIG. 2. When the force of the left direction becomes larger than the biasing force of the compression coil spring 52, the compression coil spring 52 is elastically deformed, so that the actuator 50 is moved together with the worm 42 to be put in the situation shown in FIG. 5.

Figure 7:
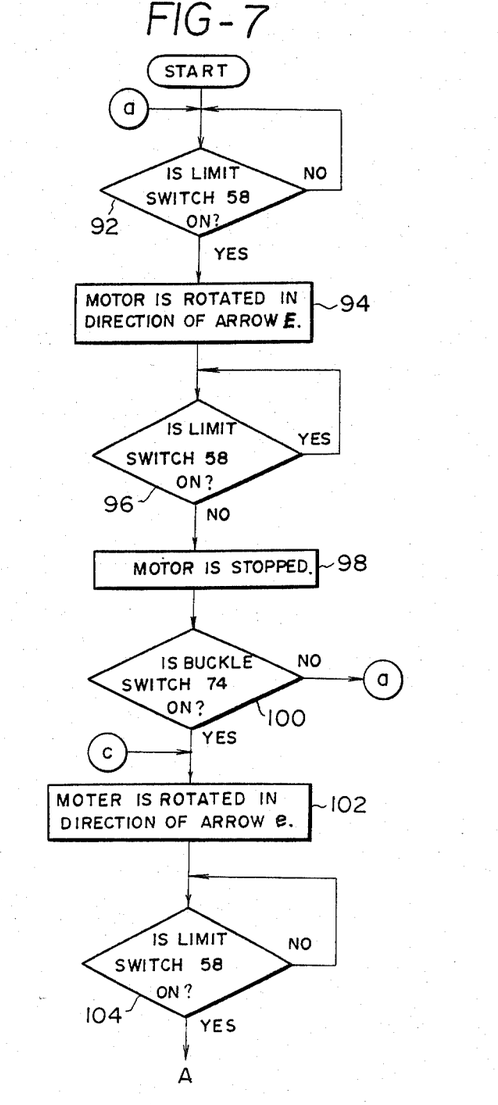
FIGS. 7 to 9 are flow charts for control of the first embodiment.
Figure 8:
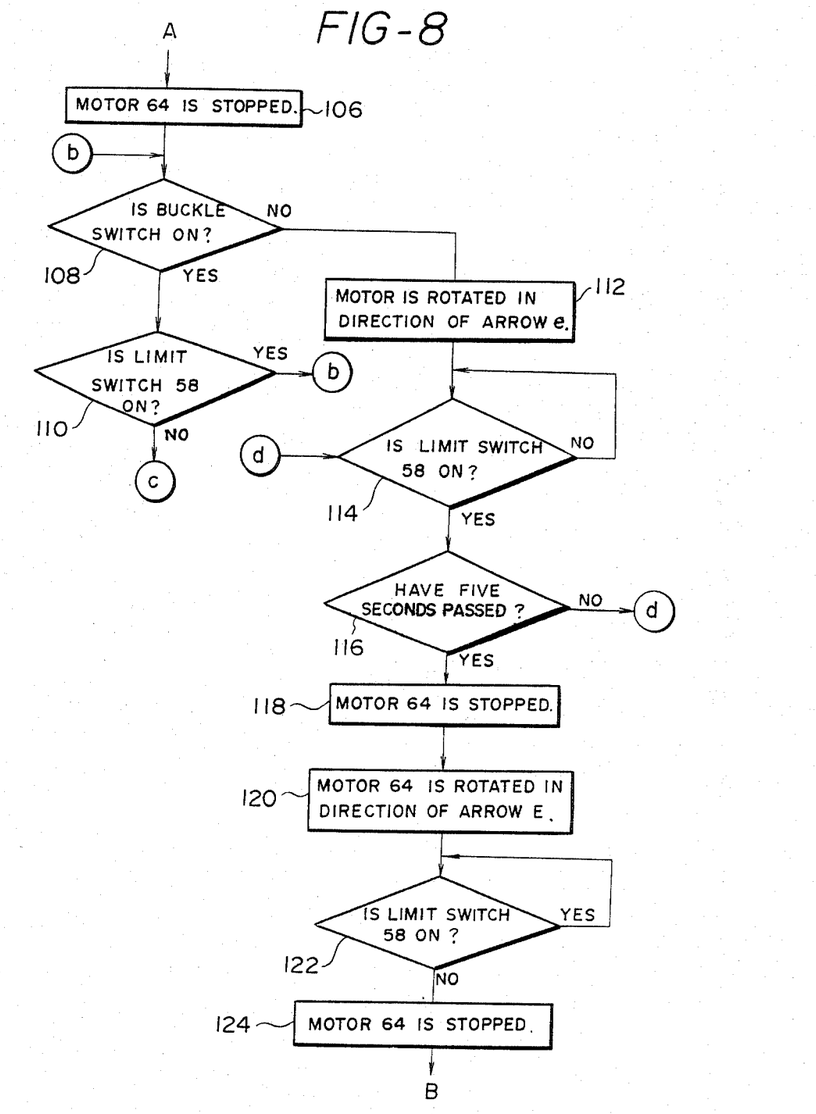
Figure 9:
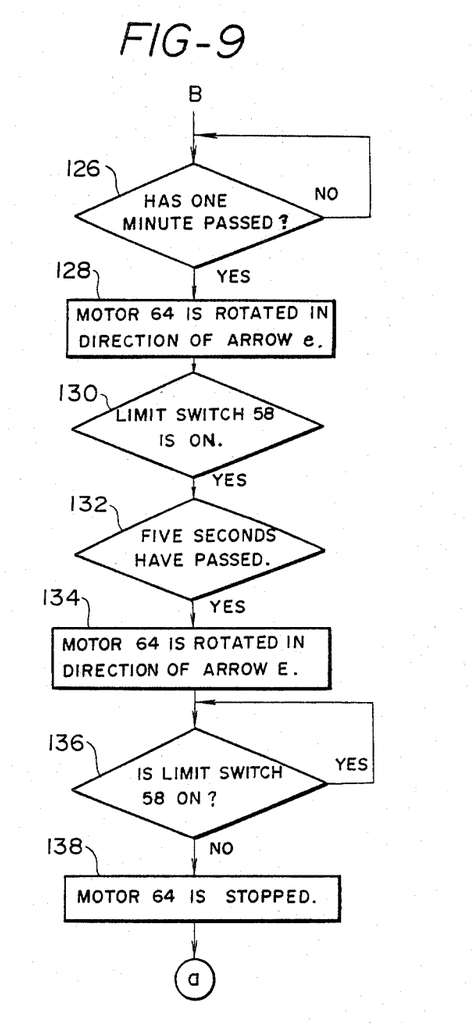

At this time the limit switch 58 is switched on and it is judged in step 92 of FIG. 7 whether the limit switch 58 is on or off. Only when the limit switch 58 is on, the microcomputer 72 excites the solenoid of the relay 78 and in a step 94 of FIG. 7 the motor 64 is rotated in the direction of arrow E to rotate the spring case 34 in the direction of arrow D shown in FIG. 2. Therefore, the outer end of the spiral spring 40 is rotated in the direction of arrow D of FIG. 2, so that the biasing force of the spiral spring 40 is weakened. That is to say, the takeup shaft 22 is rotated in a direction of increase of the biasing force of the spiral spring 40 by the unwinding of the webbing 24 but the spiral spring 40 is moved in a direction of decrease of the biasing force by the rotation of the motor 64. As a result, only a load owing to a lag in following of the motor 64 acts on the webbing 24 as a biasing force of the spiral spring 40 during the unwinding operation of the webbing 24 and, therefore, the occupant can unwind the webbing 24 under a very small resistance force.

After the occupant unwinds the webbing 24, he latches the tongue plate secured to the forward end of the webbing 24 to the buckle device. When the tongue plate is latched to the buckle device, the unwinding operation of the webbing 24 is stopped. Therefore, the spring case 34 which is being rotated in the direction of arrow D by the rotation of the motor 64 continues to decrease the biasing force of the spiral spring 40, whereby the biasing force of the spiral spring 40 becomes weaker than that of the compression coil spring 52. As a result, the worm 42 is again returned back to the position shown in FIG. 2 by the compression coil spring 52 and the limit switch 58 is switched off. In this case it is judged in a step 96 whether the limit switch 58 is on or off, and in a step 98 the rotation of the motor 64 is stopped only when the limit switch 58 is off.

In a step 100 it is judged by on or off of the buckle switch 74 whether or not the occupant has latched the tongue plate to the buckle device. When the buckle switch 74 is off, the step 100 returns back to the step 92, but when the buckle switch 74 is on, the on of the buckle switch 74 is input to the microcomputer 74 to excite the solenoid of the relay 78. In a step 102, therefore, the motor 64 is rotated in the direction of arrow e shown in FIG. 6. That is to say, the spring case 34 is rotated in the direction of arrow d of FIG. 2 to increase the biasing force of the spiral spring 40, so that the webbing 24 is retracted on to the takeup shaft 22. Accordingly, a slack of the webbing 24 restraining the occupant can be cancelled.

When the slack of the webbing 24 is cancelled, the tension of the webbing 24 is increased, so that the worm 42 is moved to compress the compression coil spring 52, again, to be put in the situation shown in FIG. 5. By the movement of the worm 42 the compression coil spring 52 switches on the limit switch 58. In a step 104 the on and the off situations of the limit switch 58 are detected by the microcomputer 74, and only when the limit switch 58 is put in the on situation the rotation of the motor 64 is stopped in a step 106.

Thus, the occupant is put in a restrained situation by the webbing 24 in which the tension of the webbing 24 is kept in a very low value. Thereafter, in an ordinary running situation of the vehicle when the occupant moves, or changes his attitude, in such a direction that the webbing 24 is unwound from the webbing retractor 10, the takeup shaft 22 rotates the inner end of the spiral spring 40 to increase the tension of the webbing 24, but the tension is very weak as compared with that in a conventional webbing retractor. As a result, the occupant does not almost feel a pressure from the webbing 24 but he is closely restrained by the webbing 24. In the ordinary running situation of the vehicle only the biasing force of the compression coil spring 52 acts as the tension of the webbing 24.

On the contrary, when the occupant moves his seat to change his attitude in such a direction that the webbing 24 is retracted into the webbing retractor 10 and a slack of the webbing 24 restraining the occupant occurs, the compression coil spring 52 moves the worm 42 to be put in the situation shown in FIG. 2. In this case, the buckle switch 74 is on and the limit switch 58 is switched off, which are respectively judged in steps 108 and 110, and the step 110 returns back to the step 102 in which the motor 64 is rotated in the direction of arrow e to increase the biasing force of the spiral spring 40 until the limit switch 58 is switched on in a step 104, i.e., the compression coil spring 52 is compressed in the step 102 and the tension of the webbing 24 is increased until the actuator 50 puts the limit switch 58 in its on situation in the step 104. Accordingly, the occupant can always be put in the closely restrained situation without the slack of the webbing 24 in the ordinary running situation of the vehicle. Also, even when the takeup shaft 22 is rotated in order to cancel the slack of the webbing 24, the tension of the webbing 24 acts on the occupant through the spiral spring 40 and, therefore, only a very mild pressure acts upon the occupant, which does not give the occupant a shock.

When the vehicle falls in an emergency situation such as a collision, the inertial locking mechanism 26 functions to stop an unwinding rotation of the takeup shaft 22, so that the occupant can be kept in safety. Particularly, as the occupant is restrained by the webbing 24 without any slack of the webbing 24, a restraining performance of the webbing 24 is much enhanced.

When any trouble occurs in the motor 64 or the microcomputer 74 in the restrained situation of the occupant by the webbing 24 and the operation of the motor 64 is made impossible, the worm 42 prevents the worm wheel 38 from its rotation and, therefore, the occupant can be maintained in the restraining situation of the webbing 24.

In case that the occupant gets off the vehicle, he releases the tongue plate from the buckle device, so that in the step 108 it is judged that the buckle switch 74 is off and in a step 112 the motor 64 is rotated in the direction of arrow e. Accordingly, the worm 42 rotates the worm wheel 38 in the direction of arrow d shown in FIG. 2 to increase the biasing force of the spiral spring 40 and to retract the webbing 24 on to the takeup shaft 22. At this time, as the occupant is put in a released situation from the webbing 24, the tension of the webbing 24 is made substantially zero and the worm 42 rotates the worm wheel 38 to the situation shown in FIG. 2. When the webbing 24 is full retracted on to the takeup shaft 22, the tension of the webbing 24 is increased and the worm 42 is again moved in the situation shown in FIG. 5. In a step 114 it is judged whether the limit switch 58 is on or off. The step 114 advances to a step 116 only when the limit switch 58 is on.

In general, it takes one or two seconds to full retract the webbing 24 on the takeup shaft 22 after the webbing 24 is released from the restraining situation on the occupant. Accordingly, in a step 116 after five seconds passed it is judged that the webbing 24 is full retracted on the takeup shaft 22, and in a step 118 the motor 64 is stopped. Then, in a step 120 the motor 64 is rotated reversely, i.e., in the direction of arrow E, so that the worm wheel 38 is rotated in the direction of arrow D shown in FIG. 2, whereby the worm 42 is returned back to the situation shown in FIG. 5 by the biasing force of the compression coil spring 52. In a step 122 it is judged that the limit switch 58 is off, and in a step 124 the motor 64 is stopped. In a step 126 it is judged whether or not one minute have passed thereafter, and in a step 128 the motor 64 is rotated in the direction of arrow e in case that the one minute has passed. The worm wheel 38 rotated in the direction or arrow d by the rotation of the motor 34 increases the biasing force of the spiral spring 40 and, therefore, the worm 42 compresses the compression coil spring 52 again to be put in the situation shown in FIG. 5. In a step 130 the situation shown in FIG. 5 is judged by switching-on of the limit switch 58, and in a step 132 it is judged whether or not the limit switch 58 has been on for five seconds. If the limit switch 58 has been on for five seconds, then in a step 134 the motor 64 is rotated in the direction of arrow E, so that the limit switch 58 is switched off. In a step 136 the switching-off of the limit switch 58 is judged, and in a step 138 the rotation of the motor 64 is stopped i.e., a retraction of the webbing 24 is completed. As set forth above, accordingly, even though the occupant grips the webbing 24 temporarily after the webbing 24 is released from the occupant, the webbing 24 is again subjected to the second retraction for the five seconds when the one minute has passed from the first retraction of the webbing 24, so that the webbing 24 can reliably be retracted on to the takeup shaft 22.

Figure 11:
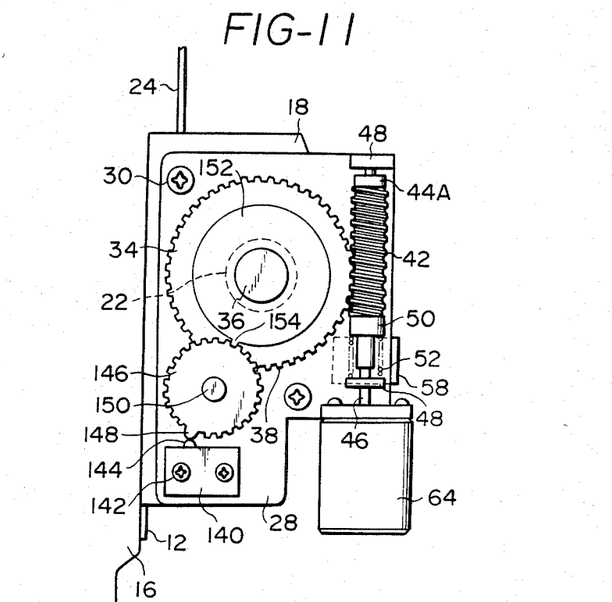
FIG. 11 is a side view showing a third embodiment of the present invention and corresponding to FIG. 2.

In this connection, a manual switch or lever for biasing the webbing 24 in the direction of its retraction can be mounted on the webbing retractor 10.

of the limit switch 140 so that the limit switch 140 is switched on.

Figure 12:
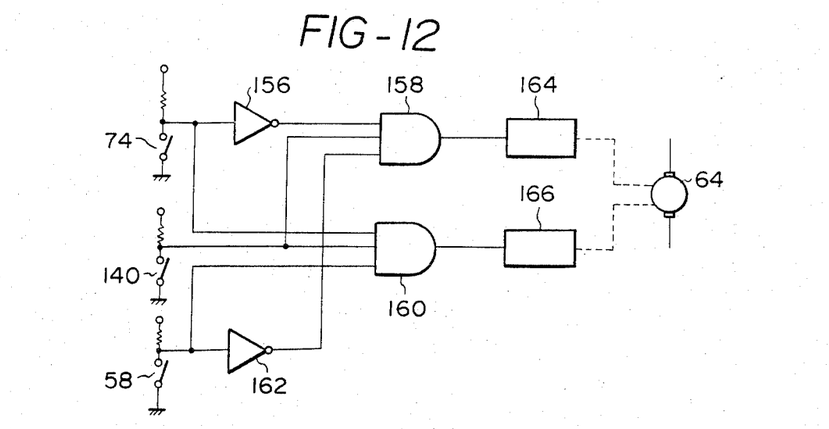
FIG. 12 is a control circuit diagram of the third embodiment.

FIG. 12 shows a logic control circuit diagram of the third embodiment and Table 1 shows a relationship between the respective switches and the motor 64 in the respective situation of the webbing 24.

TABLE 1

| WEBBING 24 | BUCKLE SWITCH 74 | LIMIT SWITCH 140 | LIMIT SWITCH 58 | MOTOR 64 |
|---|---|---|---|---|
| NON-USE | OFF (1) | ON (0) | OFF (1) | OFF |
| UNWINDING | OFF (1) | OFF (1) | ON (0) | ON (MOTOR 64 IS ROTATED IN DIRECTION OF ARROW E THROUGH DRIVING CIRCUIT 164) |
| LOCKING OF TONGUE PLATE TO BUCKLE DEVICE | ON (0) | OFF (1) | ON (0) | WHEN LIMIT SWITCH 58 IS SWITCHED FROM ON TO OFF, MOTOR 64 IS SWITCHED OFF. |
| RELEASE OF TONGUE PLATE FROM BUCKLE DEVICE | OFF (1) | OFF (1) | OFF (1) | ON (MOTOR 64 IS ROTATED IN DIRECTION OF ARROW e THROUGH DRIVING CIRCUIT 166. WHEN LIMIT SWITCH 140 IS SWITCHED FROM OFF TO ON, MOTOR 64 IS SWITCHED OFF.) |
|  | ON IN LOCKING OF TONGUE PLATE TO BUCKLE DEVICE | ON IN FULL RETRACTION OF WEBBING 24 | ON WHEN TENSION OF WEBBING 24 IS ZERO |  |

Even when a rotation of the worm 42 is made impossible due to a trouble in the motor 64, the microcomputer 72 or the like in the full retracted situation of the webbing 24, the occupant can unwind the webbing 24 from the webbing retractor 10 against an increase of the biasing force of the spiral spring 40, so that he can be put in the restrained situation by the webbing 24. That is to say, the webbing retractor 10 of the embodiment can be used in the same manner as a conventional webbing retractor retracting a webbing by a biasing force of a spiral spring, even if the trouble occurs in the motor 64, the microcomputer 72 or the like.

Figure 10:
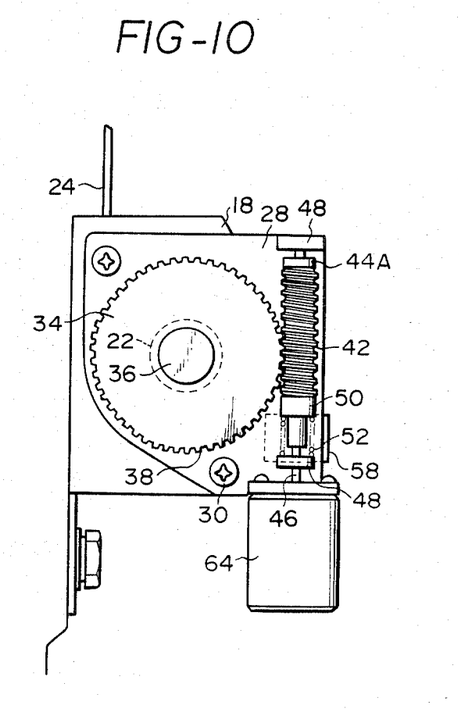
FIG. 10 is a side view showing a second embodiment of the present invention and corresponding to FIG. 2.

Next, FIG. 10 shows a second embodiment according to the present invention. In the second embodiment the pinion 60 and the gear wheel 62 are not used, which is different from the first embodiment. Namely, an output shaft of the motor 64 is directly connected to the shaft 46 and it rotates the worm 42 through the guide member 44. Accordingly, the second embodiment has more simplified construction than the first embodiment and it can obtain the same effects as the first embodiment.

In addition, FIG. 11 shows a third embodiment according to the present invention, in which a limit switch 140 is further provided as a position sensor in addition to the construction of the second embodiment. The limit switch 140 is fixed to the plate holder 28 through screws 142 and a contact of the limit switch 140 is opposed to a protrusion 148 of an intermediate gear 146. The intermediate gear 146 is rotatably supported to the plate holder 28 through a pin 150 and it is formed at an outer periphery thereof with a gear portion. The gear portion is engaged with a projection 154 formed on a disk 152 fixed to the takeup shaft 22. Accordingly, the projection 154 is engaged with the gear portion of the intermediate gear 146 only one time per one rotation of the takeup shaft 22 so that the intermediate gear 146 is rotated by one tooth of the gear portion. In this way, when the takeup shaft 22 is rotated to full retract the webbing 24 thereon, the protrusion 148 of the intermediate gear 146 is caused to contact with the contact 144

In FIG. 12 an output of the buckle switch 74 is supplied to an AND element 158 through a NOT element 156, an output of the limit switch 140 is supplied to the AND element 158 and an AND element 160, and an output of the limit switch 58 is supplied to the AND element 160 and to the AND element 158 through a NOT element 162, respectively. The AND element 158 drives the motor 64 through a driving circuit 164 in the direction of arrow E, i.e., the spiral spring 40 is rotated in such a direction that the biasing force thereof is decreased, and the AND element 160 drives the motor 64 through a driving circuit 166 in the direction of arrow e, i.e., the spiral spring 40 is rotated in such a direction that the biasing force thereof is increased.

In the third embodiment, therefore, the full retracted situation of the webbing 24 can be detected, thereby to control the motor 64 without use of such a device as a timer.

The above embodiments are such constructed that the tension of the webbing 24 and an opening and a closing of the buckle switch 74 are detected by the worm 42 so that the motor 64 is controlled, but it can be such constructed that only the tension of the webbing 24 is detected by the worm 42 so that the motor 64 is controlled. In the above embodiments the spiral spring 40 is used for biasing the takeup shaft 22, and instead thereof another resilient means can be used in the present invention. In the present invention a means for biasing the worm 42 in an axial direction thereof is not limited to the compression coil spring 52, but instead thereof another biasing means can also be used.

What is claimed is:

1. A webbing retractor adapted for use in a seatbelt system for protecting an occupant in an emergency situation of a vehicle, which comprises:
   (a) a takeup shaft retracting one end of an occupant restraining webbing thereon;
   (b) first resilient means, one end thereof being secured to the takeup shaft, biasing the takeup shaft in a direction of retraction of the webbing;

(c) a worm wheel, the other end of the resilient means being secured thereto, adjusting a biasing force of the first resilient means;

(d) a worm engaged with the worm wheel and movable in an axial direction of the worm by a predetermined amount;

(e) drive means rotatively driving the worm; and (f) control means detecting a movement amount of the axial direction of the worm and controlling the drive means to rotate the worm wheel through the worm, whereby a tension of the webbing is adjusted in its suitable situation.

2. A webbing retractor as set forth in claim 1, which further comprises second resilient means biasing the worm wheel in a direction of increase of the biasing force of the first resilient means through the worm.

3. A webbing retractor as set forth in claim 2, wherein the control means includes a microcomputer controlling the drive means, a first switch driving the drive means to rotate the worm wheel in a direction of decrease of the biasing force of the first resilient means when the first switch is switched on, and a second switch driving the drive means to rotate the worm wheel in a direction of increase of the biasing force of the first resilient means when the second switch is switched on.

4. A webbing retractor as set forth in claim 3, wherein the first switch comprises a limit switch switched on when it is caused to abut on an actuator moved together with the worm and switched off when it is separated from the actuator.

5. A webbing retractor as set forth in clam 4, wherein the worm is supported on a shaft movably in an axial direction of the shaft through a guide member fixed thereto.

6. A webbing retractor as set forth in claim 5, wherein the guide member has a non-circular sectional configuration and the worm is formed at its axial center portion with a through-hole having a non-circular sectional configuration and receiving the guide member, whereby the worm is rotatable together with the guide member and it is movable on the guide member in the axial direction of the shaft.

7. A webbing retractor as set forth in claim 6, wherein a driving force of the drive means is transmitted to the worm through gear means.

8. A webbing retractor as set forth in claim 6, wherein an output shaft of the drive means is connected to the shaft, whereby the worm is directly rotated by the drive means.

9. A webbing retractor as set forth in claim 8, which further comprises a third switch switched on when the webbing is full retracted on to the takeup shaft.

10. A webbing retractor as set forth in claim 9, wherein the third switch comprises a second limit switch switched on and off through a disk fixed to the takeup shaft to be rotated together therewith and an intermediate gear rotated in accordance with the rotation of the disk.

11. A webbing retractor as set forth in claim 10, wherein the disk is formed at its outer periphery with a projection and the intermediate gear is formed at its outer periphery with a gear portion engaged with the projection of the disk and a protrusion switching on and off the third switch, the intermediate gear being rotated by one tooth of the gear portion per one rotation of the disk, whereby, the protrusion of the intermediate gear is caused to abut on the third switch to switch it on when the webbing is full retracted on to the takeup shaft.

12. A webbing retractor adapted for use in a seatbelt system for protecting an occupant in an emergency situation of a vehicle, which comprises:

(a) a frame fixed to a vehicle body;

(b) a takeup shaft journalled on to the frame and retracting one end of an occupant restraining webbing thereon;

(c) first resilient means, one end thereof being secured to the takeup shaft, biasing the takeup shaft in a direction of retraction of the webbing;

(d) a worm wheel rotatably supported to the takeup shaft and secured with the other end of the first resilient means to adjust a biasing force of the first resilient means;

(e) a worm supported on the frame movably in an axial direction of the worm by a predetermined amount and engaged with the worm wheel;

(f) drive means rotating the worm wheel through the worm;

(g) second resilient means supported on the frame coaxially with the worm and biasing the worm wheel in a direction of increase of the biasing force of the first resilient means through the worm; and (h) control means detecting a movement amount of the axial direction of the worm and controlling the drive means to rotate the worm wheel through the worm, whereby a tension of the webbing is adjusted in its suitable situation.

13. A webbing retractor as set forth in claim 12, wherein the control means includes a microcomputer controlling the drive means, a first switch driving the drive means to rotate the worm wheel in a direction of decrease of the biasing force of the first resilient means when the first switch is switched on, and a second switch driving the drive means to rotate the worm wheel in a direction of increase of the biasing force of the first resilient means when the second switch is switched on.

14. A webbing retractor as set forth in claim 13, wherein the first switch comprises a limit switch switched on when it is caused to abut on an actuator moved together with the worm and switched off when it is separated from the actuator.

15. A webbing retractor as set forth in claim 14, wherein the worm is supported on a shaft supported to the frame and is movable in an axial direction of the shaft through a guide member fixed thereto.

16. A webbing retractor as set forth in claim 15, wherein the guide member has a non-circular sectional configuration and the worm is formed at its axial center portion with a through-hole having a non-circular sectional configuration and receiving the guide member, whereby the worm is rotatable together with the guide member and it is movable on the guide member in the axial direction of the shaft.

17. A webbing retractor as set forth in claim 16, wherein a driving force of the drive means is transmitted to the worm through gear means.

18. A webbing retractor as set forth in claim 16, wherein an output shaft of the drive means is connected to the shaft, whereby the worm is directly rotated by the drive means.

19. A webbing retractor as set forth in claim 18, which further comprises a third switch switched on when the webbing is full retracted on to the takeup shaft.

20. A webbing retractor as set forth in claim 19, wherein the third switch comprises a second limit switch switched on and off through a disk fixed to the takeup shaft and an intermediate gear rotatably supported to the frame and rotated in accordance with the rotation of the disk, the disk being formed at its outer periphery with a projection and the intermediate gear being formed at its outer periphery with a gear portion engaged with the projection of the disk and a protrusion switching on and off the third switch, whereby the intermediate gear is rotated by one tooth of the gear portion per one rotation of the disk and when the webbing is full retracted on to the takeup shaft the protrusion of the intermediate gear is caused to abut on the third switch to switch it on.

* * * * *